T. DEN BESTEN.
CLEVIS.
APPLICATION FILED JULY 3, 1909.
963,501.
Patented July 5, 1910.
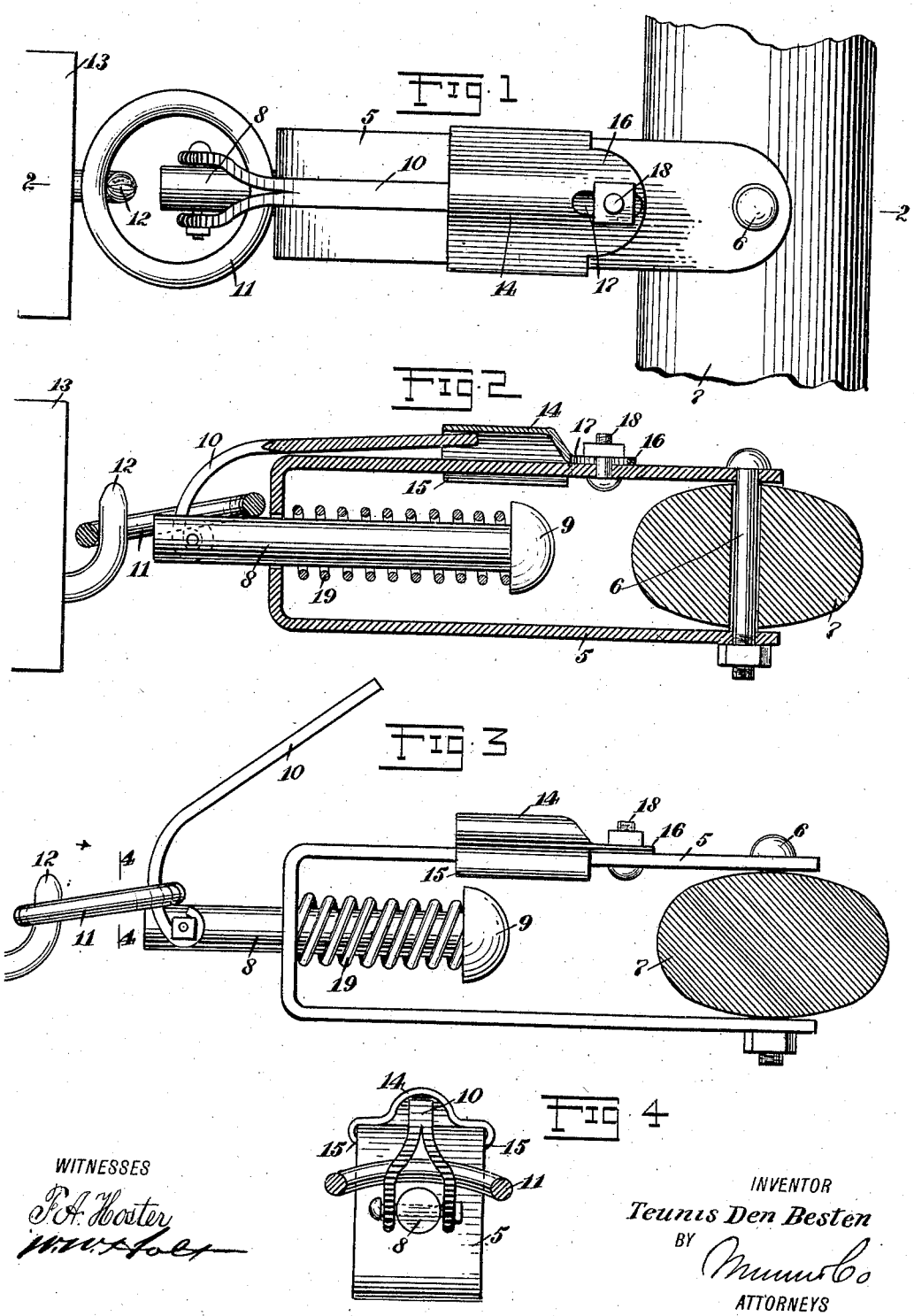
WITNESSES
INVENTOR
Teunis Den Besten
BY
ATTORNEYS

UNITED STATES PATENT OFFICE.

TEUNIS DEN BESTEN, OF CORSICA, SOUTH DAKOTA.

CLEVIS.

963,501. Specification of Letters Patent. Patented July 5, 1910.

Application filed July 3, 1909. Serial No. 505,789.

*To all whom it may concern:*

Be it known that I, TEUNIS DEN BESTEN, a citizen of the United States, and a resident of Corsica, in the county of Douglas and State of South Dakota, have invented a new and Improved Clevis, of which the following is a full, clear, and exact description.

The invention is an improvement in safety clevises of a character to automatically release the draft animal or animals from a plow or other draft appliance, should the same strike an unyielding obstruction, and thereby prevent the breaking of the implement or harness.

The object of the invention is to provide a clevis or analogous device as above defined, embodying the usual clevis link or frame, with the spring-pressed draft bolt and releasable arm pivoted to the outwardly-projecting end of the bolt, but with the arm extended to overlap the frame at the outside and engage in a keeper also arranged at the outside of the frame and preferably adjustable thereon to adapt the clevis to be released under varying strains.

Reference is to be had to the accompanying drawings forming a part of this specification, in which similar characters of reference indicate corresponding parts in all the views.

Figure 1 is a plan of the clevis embodying my invention, the clevis being shown in connection with a plow tongue and swingle or double tree; Fig. 2 is a central vertical section substantially on the line 2—2 of Fig. 1; Fig. 3 is a side view of the clevis, showing the tree in section and the pivoted arm of the draft-bolt released from the keeper; and Fig. 4 is a cross-section on the line 4—4 of Fig. 3, looking in the direction of the arrow.

The clevis embodies any usual stirrup frame or link 5, having the customary pivot-bolt 6 at its outer open end to connect it to the swingle tree, double tree or evener 7. Slidable through an opening in the rear end portion of the link or frame is a draft-bolt 8 having a head 9 at its outer end between the arms of the link and an arm 10 pivotally connected at its opposite and rear end, between which and the draft-bolt is adapted to be engaged a ring or link 11 to connect the clevis to the clevis hook 12 at the end of the tongue 13 of a plow or other draft implement. The pivoted end of the arm 10 is curved or hooked to pass over the top of the frame 5, where its free end is adapted to be engaged within a keeper 14, the keeper having inwardly-turned flanges 15 at the bottom, in sliding embrace with the upper arm of the frame, and provided with a tailpiece 16 having an elongated opening 17, longitudinally arranged, through which and the arm of the frame passes a bolt 18 adjustably securing the keeper in place. The draft-bolt 8 is normally forced forwardly or outwardly by a spring 19 which bears under the head 9 and at the inner end of the frame 5.

With the clevis connected with a plow, as shown in Figs. 1 and 2, should the latter strike an obstruction, the draft bolt will compress the spring 19, and if the obstruction be sufficiently unyielding, the arm 10 will pass to the outside of the keeper 14, which will release the link 11, as shown in Fig. 3, and thus disconnect the draft animals and prevent injury to either the plow or harness. The strain or pull on the plow, necessary to disconnect the draft animal or animals, may be varied to any desired amount within certain limits by adjusting the keeper 14.

By placing the keeper at the outside of the frame and constructing the arm to overlap the frame and engage with the keeper, the arm can be made relatively long (whereby its pressure and frictional bearing against the upper wall of the keeper under the strain of the load is considerably lessened) without increasing the length of the outwardly-projecting portion of the draft bolt, which would obviously render the construction less compact and relatively weaker. Further, this construction of the draft appliance makes the arm and keeper readily accessible and adapted to be easily reëngaged without compressing the spring, by loosening the keeper and shifting it over the end of the arm.

Having thus described my invention, I claim as new and desire to secure by Letters Patent:

1. The combination of a clevis frame, a spring-pressed draft-bolt slidable on the frame, an arm pivotally connected to the draft-bolt, a link to connect the bolt with a draft implement, engaged between the bolt and arm and slidable over the outer end of the arm, and a keeper to engage over the free end of the arm, confined to the length of the frame, the keeper being adjustable along the length of the frame to release the arm under varying strains on the draft-bolt.

2. In a coupling automatically releasable under a predetermined strain, comprising a frame, a draft-bolt slidable in the frame and projecting to the outside thereof, a spring tending to draw the draft-bolt within the frame, a keeper carried intermediate the length of the frame, and an arm pivotally connected to the outer end of the bolt and arranged to overlap the frame and engage at the outside thereof within the keeper.

3. In a coupling automatically releasable by a predetermined strain, comprising a frame, a draft-bolt slidable in the frame and projecting to the outside thereof, a spring tending to draw the bolt within the frame, a keeper arranged at the outside of the frame and having flanges inwardly turned into sliding engagement therewith, and an arm pivotally connected to the outer end of the bolt and adapted to be engaged in the keeper.

In testimony whereof I have signed my name to this specification in the presence of two subscribing witnesses.

TEUNIS DEN BESTEN.

Witnesses:
 GEO. E. CULVER,
 ADRIAN FELIX.